Sept. 16, 1947.  F. E. ETZEL, JR., ET AL  2,427,593
CAMERA SUPPORT
Filed April 4, 1946
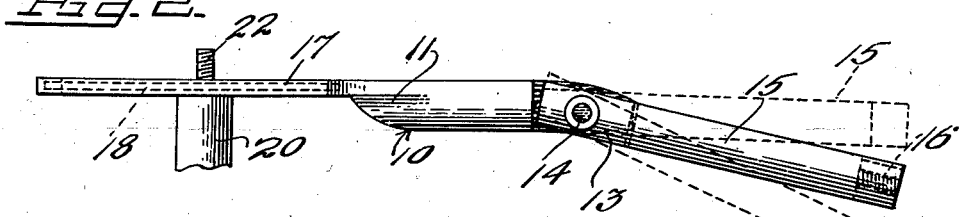
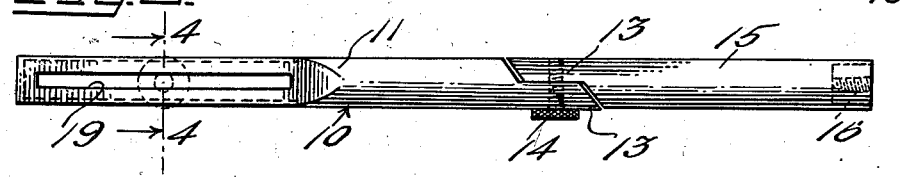
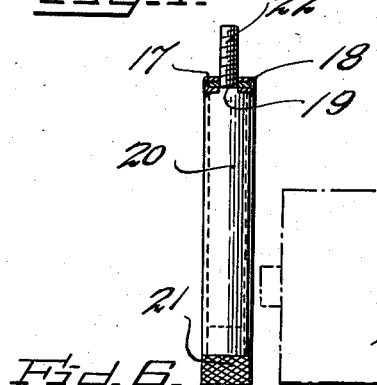
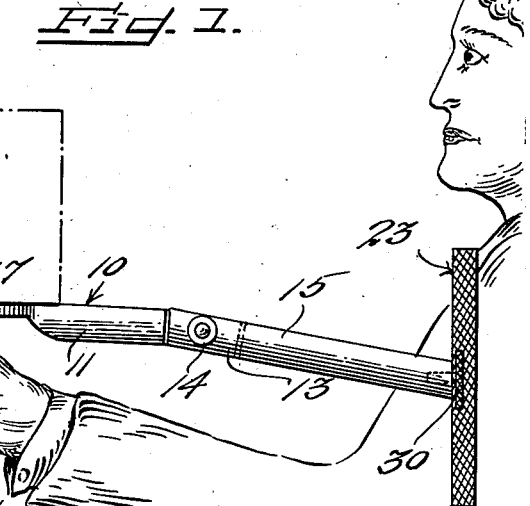
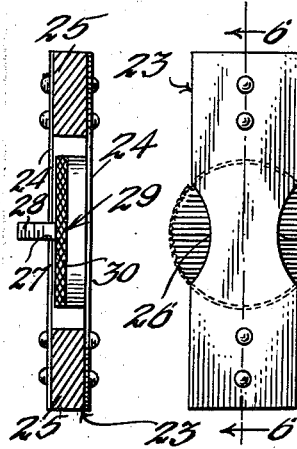
Inventors
FRANCIS E. ETZEL, JR
AND
FRANK E. ETZEL.
By Clarence A. O'Brien
and Harvey B. Jacobson
Attorneys Patented Sept. 16, 1947

2,427,593

UNITED STATES PATENT OFFICE 2,427,593

CAMERA SUPPORT

Francis E. Etzel, Jr., and Frank E. Etzel, Oradell, N. J.

Application April 4, 1946, Serial No. 659,488

4 Claims. (Cl. 95—86)

1

This invention relates to a camera support and more particularly to a support for cameras of the ciné type.

The primary object of the invention is to steady a camera during the exposure of film contained therein.

Another object is to facilitate the rapid adjustment of the camera on the support in order to render the controls on the camera readily accessible to the user.

The above and other objects may be attained by employing this invention which embodies among its features a tubular body bent intermediate its ends to simulate the general contour of a gunstock, a shoulder rest at the rear end of the body, a handle movable longitudinally of the body near its forward end and a threaded stud carried by the handle and adapted to enter the tripod socket of a camera to clamp the camera in place on the body.

Other features include a pivot joint at the junction of the tubular body and the shoulder rest to facilitate the alteration of the angular relation and the body, which pivot joint is separable to enable the body and shoulder rest to be disconnected for convenient transportation and storage.

Other features include a shoulder pad adapted to be detachably connected to the shoulder rest, and to be conveniently detached and mounted on the camera support for convenient transportation.

In the drawings:

Figure 1 is a side view of a camera support embodying the features of this invention showing the same as it would appear when in use, Figure 2 is a fragmentary enlarged side view of the camera support showing the shoulder pad removed, Figure 3 is a top plan view of Figure 2, Figure 4 is a transverse sectional view taken substantially along the line 4—4 of Figure 3, Figure 5 is a rear view of the shoulder pad, and Figure 6 is a longitudinal sectional view taken substantially along the line 6—6 of Figure 5.

Referring to the drawings in detail my improved support is designated generally 10 and comprises a tubular body 11 carrying at its rear end a tongue 13 which is pierced to receive a set screw 14 by which the shoulder rest 15 is adjustably attached to the body 11. Both the body 11 and the shoulder rest are formed of tubular material and fitted in the rear end of the shoulder rest 15 is an internally screw-threaded plug 16 the purpose of which will more fully here-

2 inafter appear. The forward end of the tubular body 11 is flattened as at 17 and contains a reinforcing strip 18 to lend rigidity to the flattened area 17. Formed in the flattened extension 17 and the reinforcing strip 18 is a longitudinal slot 19 for reception of the handle stud to be more fully hereinafter described.

A handle 20 comprising a length of tubing is provided at one end with a closure plug 21 and carries at its other end an axially disposed threaded extension 22 which is adapted to project through the slot 19 and enter the tripod socket of a camera mounted on the support.

A shoulder pad designated generally 23 is adapted to be attached to the rear end of the shoulder rest, and this pad comprises a pair of spaced parallel plates held in spaced relation by spacer blocks 25 at opposite ends thereof, and formed intermediately their ends with oppositely disposed recesses 26. One of the plates 24 is pierced midway its length and of its side edges with an opening 27 for the reception of the shank 28 of a screw designated generally 29 having a relatively large head 30 which is accessible from oppostie sides of the shoulder rest 23. The shank 28 of the screw is of a diameter readily to be received in the tripod socket of a camera for transportation purposes and when in use is received in the threaded socket formed in the plug 16, as suggested in Figure 1.

In use a camera is placed in position on the flattened extension 17 and the threaded stud 22 on the handle 20 is passed through the slot 19 to enter the tripod socket of the camera. The device may then be placed to the shoulder in the fashion of an ordinary gunstock and the handle 20 grasped in one hand of the user, usually the left hand, while the other hand is free to manipulate the camera controls to effect proper film exposure. By loosening the stud 22 it is obvious that the camera may be shifted longitudinally to bring the controls within the easy reach of the other hand. By loosening the set screw 14 the angular relation of the body 11 and the shoulder rest 15 may be changed to suit the user so that the camera may at all times be held in a horizontal position and yet its height above the ground may be varied. Obviously with the use of a device of this character the camera will be steadied during the film exposure. Should it be so desired the shoulder pad 23 may be attached as suggested in Figure 1, though it is perfectly obvious that the device will function without the use of the pad.

While in the foregoing there has been shown and described the preferred embodiment of this invention it is to be understood that minor changes in the details of construction, combination and arrangement of parts may be resorted to without departing from the spirit and scope of the invention as claimed.

We claim:

1. A camera support comprising a tubular body bent intermediate its ends to simulate the general contour of a gunstock, a shoulder rest at the rear end of the body, a handle movable longitudinally of the body near its forward end and a threaded stud carried by the handle adapted to enter the tripod socket of a camera and clamp the camera in place on the tubular body, and a shoulder pad adapted to be detachably secured to the shoulder rest.

2. A camera support comprising a tubular body bent intermediate its ends to simulate the general contour of a gunstock, a shoulder rest detachably connected to the rear end of the body, the forward end of the body having a longitudinal slot therein, a handle and a threaded stud on one end of the handle, said stud being projected through the slot and entered into the tripod socket of a camera to clamp the camera to the body, and a shoulder pad adapted to be detachably secured to the shoulder rest.

3. A camera support comprising a tubular body bent intermediate its ends to simulate a gunstock, a flattened extension at the forward end of the body, said extension having a longitudinal slot therein, a handle, a threaded stud extending axially from one end of the handle and adapted to project through the slot and into the tripod socket of a camera to hold the camera on the support, and a shoulder pad adapted to be detachably secured to the body at the end opposite the flattened end.

4. A camera support comprising a body, a flattened extension at the forward end of the body, said flattened extension having a longitudinal slot therein, a shoulder rest adjustably secured to the end of the body opposite the flattened extension for pivotal movement in a plane perpendicular to the plane of the flattened extension, a handle, and a threaded stud on the handle adapted to project through the slot in the extension and enter the tripod socket of a camera to hold the camera on the support.

FRANCIS E. ETZEL, Jr.
FRANK E. ETZEL.

REFERENCES CITED

The following references are of record in the file of this patent:

UNITED STATES PATENTS

| Number | Name | Date |
|---|---|---|
| 1,709,387 | Bradfield | Apr. 16, 1929 |
| 2,370,611 | DuMais | Feb. 27, 1945 |

FOREIGN PATENTS

| Number | Country | Date |
|---|---|---|
| 3,779 | Great Britain | Oct. 19, 1888 |